United States Patent
Avanindra et al.

(10) Patent No.: US 11,210,238 B2
(45) Date of Patent: Dec. 28, 2021

(54) SECURING DATA LOGS IN MEMORY DEVICES

(71) Applicant: Cypress Semiconductor Corporation, San Jose, CA (US)

(72) Inventors: Avi Avanindra, Santa Clara, CA (US); Stephan Rosner, Campbell, CA (US); Cliff Zitlaw, San Jose, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 28 days.

(21) Appl. No.: 16/358,236

(22) Filed: Mar. 19, 2019

(65) Prior Publication Data

US 2020/0133887 A1 Apr. 30, 2020

Related U.S. Application Data

(60) Provisional application No. 62/783,477, filed on Dec. 21, 2018, provisional application No. 62/752,472, filed on Oct. 30, 2018.

(51) Int. Cl.
| | |
|---|---|
| *G06F 12/00* | (2006.01) |
| *G06F 12/14* | (2006.01) |
| *G06F 13/42* | (2006.01) |
| *G06F 21/60* | (2013.01) |
| *G06F 21/44* | (2013.01) |

(52) U.S. Cl.
CPC ...... *G06F 12/1466* (2013.01); *G06F 13/4282* (2013.01); *G06F 21/44* (2013.01); *G06F 21/602* (2013.01); *G06F 21/606* (2013.01)

(58) Field of Classification Search
CPC ............ G06F 12/1466; G06F 13/4282; G06F 21/602; G06F 21/606; G06F 21/44
See application file for complete search history.

(56) References Cited

U.S. PATENT DOCUMENTS

| | | | | |
|---|---|---|---|---|
| 5,974,500 A | * | 10/1999 | Maletsky | G11C 7/24 |
| | | | | 711/103 |
| 6,088,257 A | * | 7/2000 | Jeon | G11C 11/22 |
| | | | | 365/145 |
| 6,289,455 B1 | | 9/2001 | Kocher et al. | |
| 6,289,457 B1 | * | 9/2001 | Bishop | G06F 21/00 |
| | | | | 726/21 |

(Continued)

OTHER PUBLICATIONS

Infineon Technologies AG, Chip Card & Security ICs My-d vicinity, Jul. 2007; 10 pages.

(Continued)

*Primary Examiner* — Prasith Thammavong
*Assistant Examiner* — Richard L Sutton

(57) ABSTRACT

An apparatus including non-volatile memory to store a forensic key and data, the data received from a host computing system. A processing device is coupled to the non-volatile memory and is to: allow writing the data, by the host computing system, to a region of the non-volatile memory; in response to a lock signal received from the host computing system, assert a lock on the region of the non-volatile memory, the lock to cause a restriction on access to the region of the non-volatile memory by an external device; and provide unrestricted access, by the external device, to the region of the non-volatile memory in response to verification of the forensic key received from the external device.

20 Claims, 6 Drawing Sheets

(56) References Cited

U.S. PATENT DOCUMENTS

| | | | |
|---|---|---|---|
| 7,107,388 B2 | 9/2006 | Zimmer et al. | |
| 7,395,435 B2 | 7/2008 | Benhammou et al. | |
| 7,757,101 B2 | 7/2010 | Nonaka et al. | |
| 8,539,238 B2 | 9/2013 | Rudelic et al. | |
| 8,566,940 B1 | 10/2013 | Rudelic et al. | |
| 8,925,098 B2 | 12/2014 | Hyde et al. | |
| 9,118,467 B2 | 8/2015 | Maletsky et al. | |
| 10,318,438 B1* | 6/2019 | Hershman | G06F 9/4401 |
| 2004/0083346 A1* | 4/2004 | Chevallier | G06F 12/1433 |
| | | | 711/163 |
| 2004/0215910 A1 | 10/2004 | Okaue et al. | |
| 2006/0143367 A1* | 6/2006 | Dubai | G06F 12/1466 |
| | | | 711/103 |
| 2007/0115743 A1* | 5/2007 | Sartori | G11C 16/08 |
| | | | 365/221 |
| 2008/0034153 A1 | 2/2008 | Lee et al. | |
| 2008/0189557 A1* | 8/2008 | Pipitone | G06F 12/1425 |
| | | | 713/193 |
| 2009/0259784 A1 | 10/2009 | Perry et al. | |
| 2010/0235056 A1* | 9/2010 | Schuetze | B60R 21/01332 |
| | | | 701/45 |
| 2013/0117499 A1* | 5/2013 | Shao | G06F 12/1425 |
| | | | 711/103 |
| 2013/0145083 A1* | 6/2013 | Suzuki | G06F 21/79 |
| | | | 711/103 |
| 2013/0204513 A1* | 8/2013 | Pandy | G06F 12/1441 |
| | | | 701/114 |
| 2014/0082257 A1* | 3/2014 | Scouller | G06F 21/79 |
| | | | 711/103 |
| 2014/0173294 A1 | 6/2014 | Buer et al. | |
| 2014/0325176 A1* | 10/2014 | Messina | G06F 21/10 |
| | | | 711/164 |
| 2015/0012974 A1 | 1/2015 | Unitt et al. | |
| 2015/0074406 A1 | 3/2015 | Nagai et al. | |
| 2015/0235020 A1 | 8/2015 | Nagai et al. | |
| 2016/0012891 A1 | 1/2016 | Intrater et al. | |
| 2016/0048447 A1 | 2/2016 | Solihin | |
| 2016/0188890 A1* | 6/2016 | Naeimi | G06F 21/74 |
| | | | 711/103 |
| 2016/0299720 A1* | 10/2016 | Berntsen | G06F 3/0659 |
| 2017/0060779 A1 | 3/2017 | Falk et al. | |
| 2017/0060782 A1* | 3/2017 | Chinnakkonda Vidyapoornachary | G06F 21/88 |
| 2017/0091123 A1* | 3/2017 | Sato | G06F 12/1458 |
| 2017/0329995 A1* | 11/2017 | Benoit | G06F 21/64 |
| 2018/0189195 A1* | 7/2018 | Chun | G06F 12/1425 |
| 2018/0260339 A1* | 9/2018 | Shallal | G06F 3/0658 |
| 2018/0267920 A1* | 9/2018 | Lin | G06F 9/4401 |
| 2018/0275900 A1* | 9/2018 | Teranishi | G06F 3/0688 |
| 2018/0276146 A1* | 9/2018 | Dover | G06F 3/0688 |
| 2019/0171608 A1* | 6/2019 | Kunz | G06F 13/364 |
| 2019/0278914 A1* | 9/2019 | Le Roy | G06F 21/57 |

OTHER PUBLICATIONS

Numonyx, Axcell P30—65nm Flash Memory, Apr. 2010; 90 pages.
International Search Report for International Application No. PCT/US19/51577 dated Jan. 31, 2020; 4 pages.
Written Opinion of the International Searching Authority for International Application No. PCT/US19/51577 dated Jan. 31, 2020; 6 pages.

* cited by examiner

SECURING DATA LOGS IN MEMORY DEVICES

RELATED APPLICATIONS

This application claims the benefit of priority to U.S. Provisional Patent Application No. 62/752,472, filed Oct. 30, 2018, and U.S. Provisional Patent Application No. 62/783,477, filed on Dec. 21, 2018, which are herein incorporated by these references in their entirety.

TECHNICAL FIELD

The disclosure relates to the field of memory devices, and in particular, to securing data logs or other types of data stored in the memory devices.

BACKGROUND

Non-volatile memory (NVM), such as ferroelectric RAM (FRAM) and magneto-resistive RAM (MRAM), is used for data logging applications in automotive (e.g., black box or operational data), industrial (e.g., store positions of robotic arms before power loss), medical (e.g., store patient data), and financial applications (e.g., to store critical transaction data), to name a few. Data logging is performed in NVM devices so that the logged data persists after a crash or power loss event. The logged data may then be reviewed to help ascertain the cause of the event. Non-volatile memory such as FRAM or MRAM may be employed within such NVM devices due to fast write times to these types of NVM devices, e.g., the ability to store the last milliseconds of data to FRAM/MRAM right before an event that causes a loss of power.

There are instances where these data logs are quite valuable and are even used as evidence in litigation. For example, in an automotive black-box device, logged data may be used as proof of what happened right before an accident or manufacturing failure, such as were seat belts fastened, did the airbags deploy, what was the speed, what actions were taken, what was the engine temperature, and other such sensor data. Because such data logs are valuable, the NVM devices that store the data logs are susceptible to attack or access in order to retrieve and/or alter the data logs.

BRIEF DESCRIPTION OF THE DRAWINGS

The disclosure is illustrated by way of example, and not of limitation, in the figures of the accompanying drawings.

DETAILED DESCRIPTION

Figure 1:
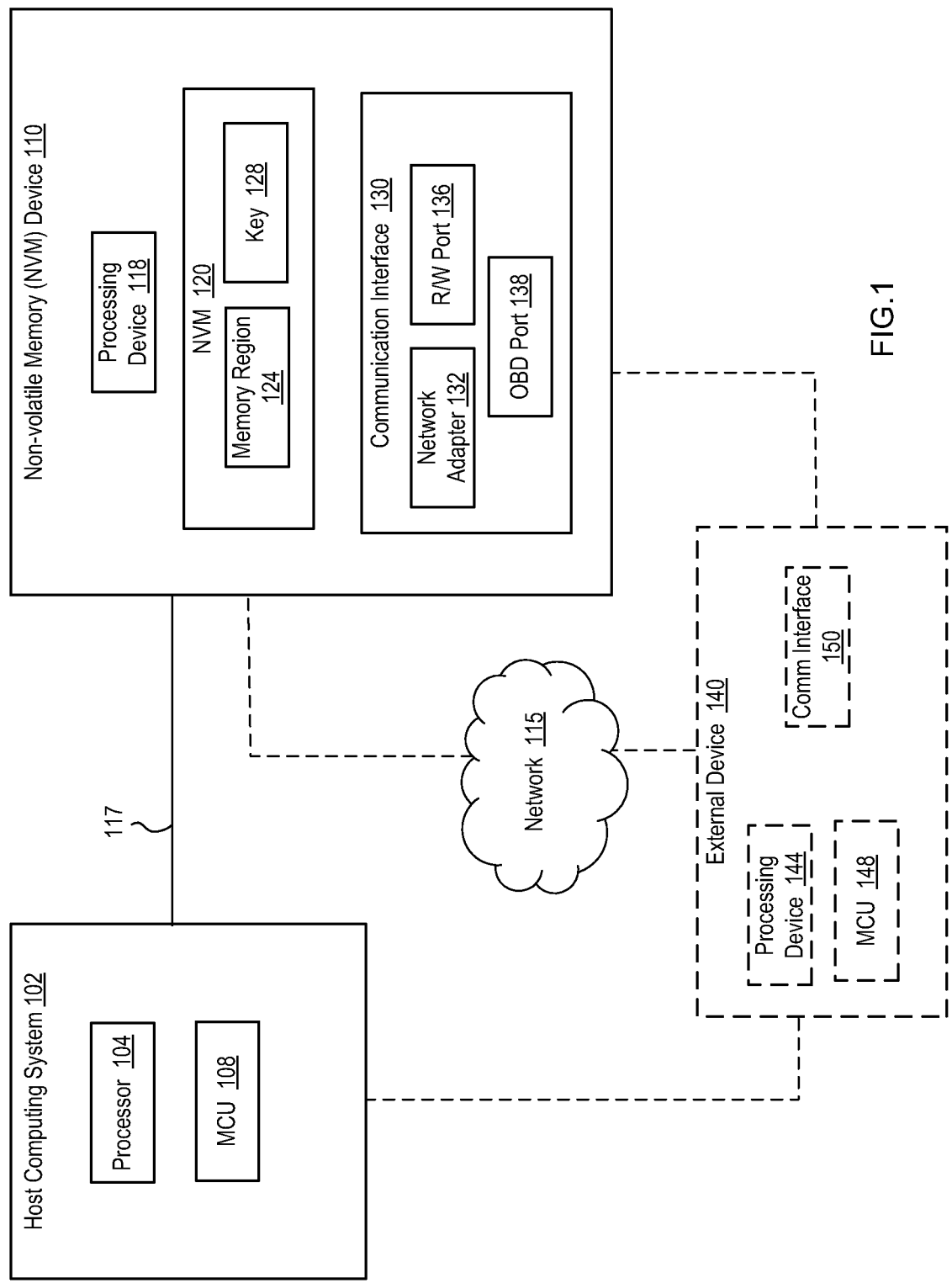
FIG. 1 is a block diagram of a system that employs a NVM device to log data according to various embodiments.

Because data logged in non-volatile memory (NVM) such as FRAM and MRAM are valuable, this data are a target of attack. A specific, credible threat is an attack on the FRAM memory bus. For example, the data logs (or other types of data) of an automotive black-box device may be retrieved via an on-board diagnostics (OBD) port with an OBD scan tool to extract the data. The OBD port connects to an on-board computer that monitors emissions, mileage, speed, and other data about the car.

In embodiments, the OBD scan tool retrieves diagnostic codes and can also monitor real-time data like GPS location, accelerometer data, crash detection, engine temperature, fuel rate, oxygen sensor voltages, battery voltage level, time engine has been running, and the like. Some OBD scan tools are Bluetooth® (BT)-enabled so they can read out data into a mobile or other BT-enabled device. Anyone can use an OBD scanner, which are widely available, to get access to or alter the data stored in the NVM memory of the black-box device.

In embodiments, therefore, memory regions of the NVM devices that store the data logs may be locked by the NVM device in response to a trigger event such as an accident in a car or an airplane, a power shutdown event in a factory, and the like. Once locked, the memory content in that region cannot be erased, overwritten, and/or read depending on access rights associated with the lock as will be discussed. Different methods or means may be employed to apply such a lock to the NVM device. Furthermore, different methods or means may be employed to securely unlock the NVM device to provide secure access to the data logs by an authorized external device, e.g., one employed by law enforcement or investigators.

In one embodiment, an apparatus or device includes non-volatile memory to store a forensic key and data, the data received from a host computing system, and a processing device (such as a microcontroller or a memory control unit (MCU)) coupled to the non-volatile memory. In embodiments, the processing device is to: allow writing the data, by the host computing system, to a region of the non-volatile memory, and in response to a lock signal received from the host computing system, assert a lock on the region of the non-volatile memory. The lock may cause a restriction on access to the region of the non-volatile memory by an external device. The processing device may further provide unrestricted access, by the external device, to the region of the non-volatile memory in response to verification of the forensic key received from the external device. Multiple and different forensic keys may be used to separately provide unrestricted access to different regions of the memory.

In another embodiment a method may include, in response to powering up a non-volatile memory (NVM) device, restricting, by a processing device of the NVM device, access to a memory region of the NVM device, wherein the NVM device stores a cryptographic key. The method may further include authenticating, using the cryptographic key, secure interaction with a host computing system, where the host computing system also stores the cryptographic key. The method may further include unrestricting, by the processing device, access to the memory region of the NVM device in response to successful authentication. The method may further include logging, by the processing device, data received from the host computing system within the memory region of the non-volatile memory device. The method may further include restricting, by the processing device, access to the memory region of the non-volatile memory device in response to a power loss of the non-volatile memory device.

FIG. 1 is a block diagram of a system 100 that employs a NVM device 110 to log data according to various embodiments. In embodiments, the system 100 includes a host computing system 102 coupled to the NVM device 110, and an optional external device 140. The host computing system 102 may be coupled to the NVM device 110 via a bus 117 such as a serial peripheral interface (SPI) bus, an inter-integrated circuit (I2C) bus, or other type of bus transfer protocol, for example. The external device 140 may communicate with the NVM device 110 remotely over a network 115, such as a local area network (LAN), a personal area network (PAN), or a wide area network (WAN), to include the Internet. The external device 140 may also communication directly with the NVM device 110 if attached directly to a port of the NVM device 110, such as a diagnostics port.

In various embodiments, the host computing system 102 includes a processor 104 and a memory control unit 108 such as a memory controller. The NVM device 110 may include its own on-board processing device 118, which may be a microcontroller (or other integrated circuit such as an MCU), non-volatile memory (NVM) 120 such as FRAM, MRAM, or phase change memory, and a communication interface 130. The NVM 120 may include at least one memory region 124 that is writable by the MCU 108 and a cryptographic key 128 with which to verify or authenticate access by either or both of the host computing system 102 and the NVM device 110.

In embodiments, the communication interface 130 includes a network adapter 132 to communicate over the network 115, a read/write port 136 over which to be accessed by the host computing system 102, and an on-board diagnostics (OBD) port 138 over which the external device 140 may directly access the NVM device 110. The external device 140 may include a processor 144, an MCU 148, and a communication interface 150 for communicating with the NVM device 110. The systems discussed hereinafter may include these various components even if not explicitly discussed in one of the other Figures. In some cases, similar components are similarly labeled.

Figure 2:
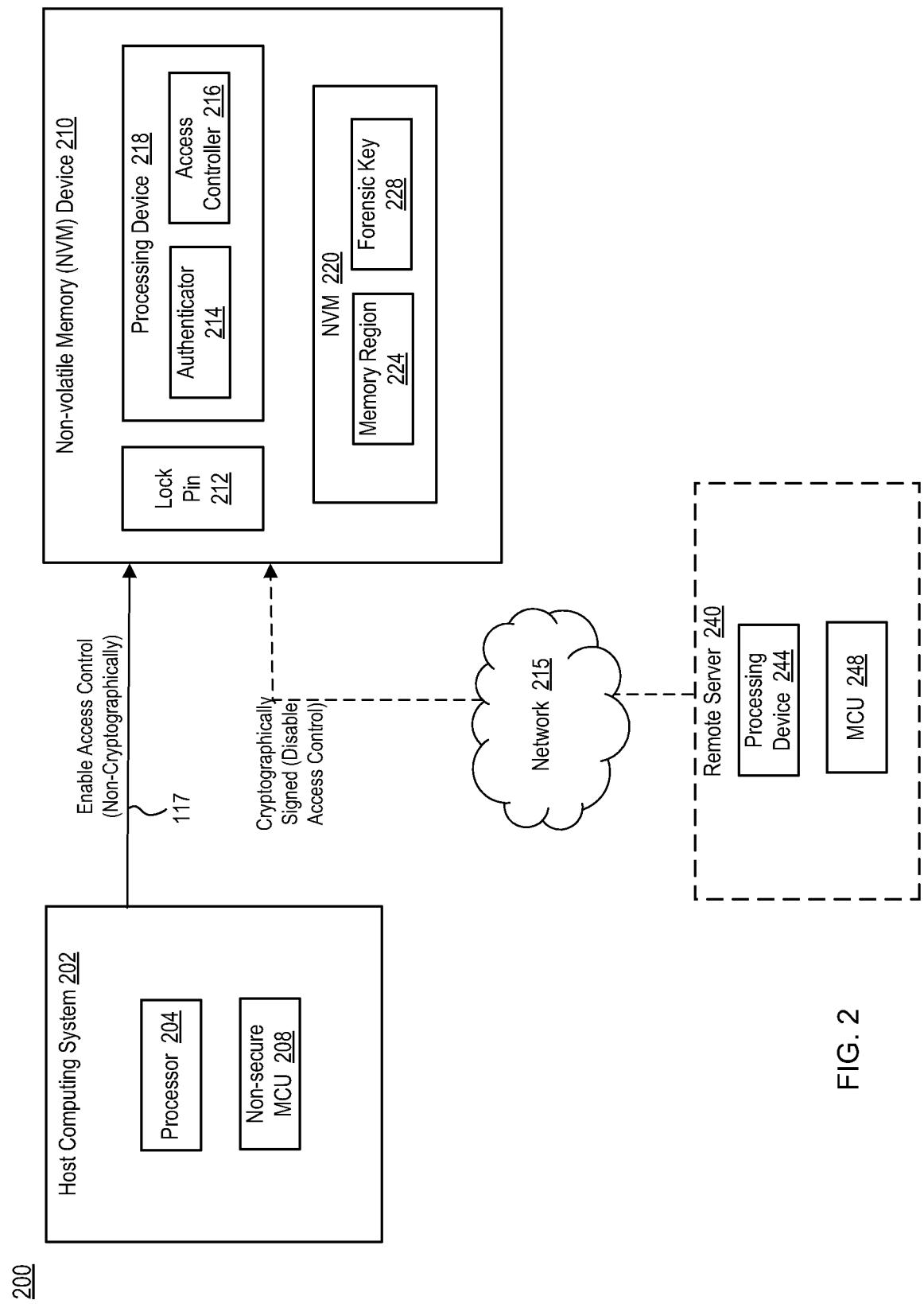
FIG. 2 is a block diagram of a system that employs a NVM device in which a host computing system has a non-secure memory controller unit (MCU), according to an embodiment.

FIG. 2 is a block diagram of a system 200 that employs a NVM device 210 in which a host computing system 202 has a non-secure MCU 208, according to an embodiment. In embodiments, the system 200 further includes an optional remote server 240 that may obtain access to the NVM device 210 over a network 215. The remote server 240 may include a processor 244 and an MCU 248. The host computing system 202 may further include a processor 204.

In embodiments, the NVM device 210 includes a lock pin 212, a processing device 218, and NVM 220. In the embodiments, the processing device 218 includes an authenticator 214 and an access controller 216, and the NVM 220 includes a memory region 224 and a forensic key 228. The memory region 224, for example, may be an array of data logs. The authenticator 214 may be used to verify or authenticate access to the memory region 224 of the NVM 220, e.g., by the remote server 240 or the external device 140. The access controller 216 may determine what access rights are granted to the remote server 240 or the external device 140, e.g., after verification or authenication of such access by the authenticator 214. In embodiments, the forensic key 228 is stored in the NVM 220 of the NVM device 210 at manufacturing and may be used by the authenticator 214 to provide the verification or authentication necessary for access to the NVM 220, e.g., after a crash or power loss event.

TABLE 1

| Step | Action | NVM State | Read/Write Access |
|---|---|---|---|
| 1 | Power Up | Unlocked | Allowed |
| 2 | Logging | Unlocked | Allowed |
| 3 | Detect Power Loss Event | Unlocked | Allowed |
| 4 | Host Sends Lock Signal | Locked | Restricted |
| 5 | Power Down | Locked | Restricted |
| 6 | Power Up After Event | Locked | Restricted |

In various embodiments, with continued reference to FIG. 2, Table 1 illustrates steps associated with detecting a crash or power loss event and locking the NVM 220 in response to the event. Upon powering up the system 200, the host computing system 202 enables access control of the NVM 220 on the NVM device 210 non-cryptographically (step 1). This is because the non-secure MCU 208 may be a microcontroller that does not support cryptographic operations. The host computing system 202 may then be allowed to write to data logs in the memory region 224 of the NVM 220 while in the unlocked state (step 2).

In the various embodiments, the host computing system 202 may detect a crash or power loss event while access to the NVM 220 of the NVM device 210 is still allowed (step 3). The detection may, for example, include detection of an airbag deployment, an accelerometer that detects a critically fast deceleration, or other sensor value that may detect imminent power loss or a critical failure in the host computing system 202. In response to detecting the crash or power loss event, the host computing system 202 may send a lock signal over the bus 117 to the NVM device 210, to signal to the processing device 218 to lock the non-volatile memory (NVM) 220 (step 4). The lock may cause a restriction on access to the memory region 224 of the NVM 220 by an external device. The restriction on access to the memory region 224 may include disallowance of erasure of the data, of write operations, or of read operations to the memory region 424. In additional or alternative embodiments, the restriction on access to the memory region 224 includes any of read-only access, writing to only erased sectors of the memory region 224, disallowance of erasure of one or more sectors of the memory region 224, full access to some sectors and no access to other sectors of the memory region 224, or limited access to some sectors and no access to other sectors of the region 224 of the NVM 220.

In the various embodiments, the lock signal is, or is located in, a serial peripheral interface (SPI) command. The SPI command, for example, may include an opcode to signal to the MCU 218 to assert the lock on the memory region 224 of the NVM 220 and to specify the restriction on the access. In an alternative embodiment, the lock signal is a combination of SPI commands, which are to trigger the lock on the memory region 224 of the NVM 220 or a memory interface command that is to trigger the lock. In a further embodiment, the lock signal is information embedded within a subfield of an existing command received from the host computing system 202, e.g., a power loss signal or the like.

In the various embodiments, the lock on the memory region 224 may be asserted via assertion of the lock pin 212 (e.g., a hardware lock pin) on the NVM device 210 by the lock signal. In other embodiments, the lock is a memory location in the memory region 224 of the non-volatile memory 220 to which a lock command, within the lock signal, is written.

In embodiments, the host computing system 202 may power down due to the crash or the power loss event (step 5). The memory region 224 of the NVM 220 remains locked with the access restrictions upon power up after having been powered down for any length of time (step 6).

In embodiments, in order to gain access to the data logs stored in the memory region 224 of the NVM 220, the authenticator 214 of the processing device 218 is to verify (or authenticate), using the forensic key 228, the remote server 240 or the external device 140 (or whichever device attempts access). To perform verification, the authenticator 214 may perform a comparison of the forensic key 228 with a second forensic key provided by the remote server 240 or the external device 140.

In embodiments, to authenticate access by the remote server 240 (or the external device 140), the remote server (or external device) may receive a counter value (e.g., a nonce value) from the NVM 210 that is added to the forensic key. The counter value may be combined with the forensic key 228, and the combination thereof hashed (using a secure hash algorithm (SHA), for example) to generate a hash-based message authentication code (HMAC) or other digest. The authenticator 214 may then generate the same HMAC (or digest), using its forensic key 228, with the same SHA and thereby authenticate a match of the HMAC/digest values. Once verified or authenticated, the remote server 240 or the external device 140 may send an unlock command to the NVM device 210 in order to read from and/or write to the memory region 224. In one embodiment, the NVM device 210 is automatically unlocked upon success verification or authentication.

Figure 3:
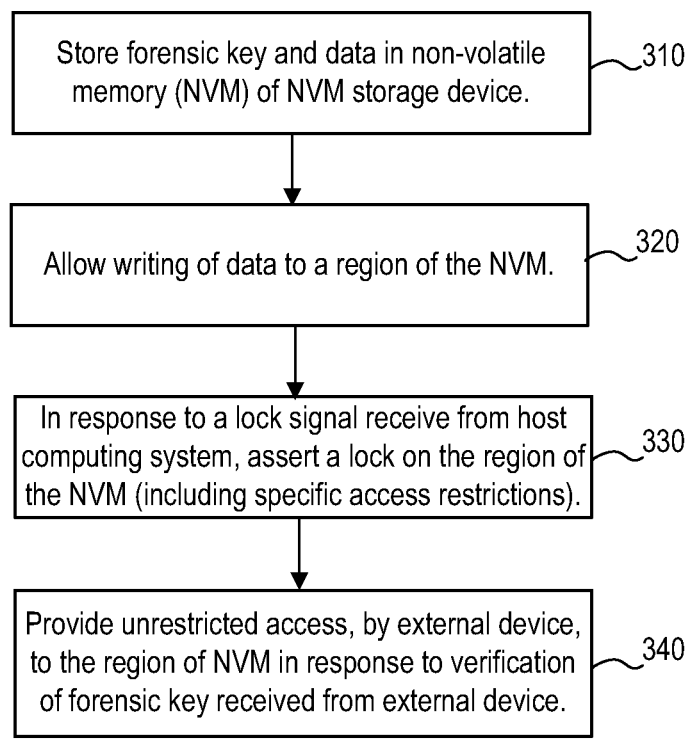
FIG. 3 is a flow diagram of a method for securing data within the NVM device of FIG. 2 according to an embodiment.

FIG. 3 is a flow diagram of a method 300 for securing data within the NVM device 210 of FIG. 2 according to an embodiment. The method 300 may be performed by processing logic that may comprise hardware (e.g., circuitry, dedicated logic, programmable logic, microcode, etc.), software (such as instructions run on a processing device), firmware, or a combination thereof. In one embodiment, the method 300 is performed by the NVM device 210, and more specifically by the processing device 218 of the NVM device 210.

With reference to FIG. 3, the method 300 begins with storing the forensic key 228 (e.g., when the NVM device is manufactured) and data in the NVM 220 of the NVM device 210 (310). The data may include data logs associated with operation of the host computing system 202 or associated systems coupled to the host computing system 202. The method 300 may continue with the processing logic allowing writing the data, by the host computing system, to a region of the non-volatile memory, e.g., the memory region 224 (320). The method 300 may continue with the processing logic, in response to a lock signal received from the host computing system 202, asserting a lock on the region of the non-volatile memory, the lock to cause a restriction on access to the region of the non-volatile memory by an external device (330). The method 300 may continue with the processing logic providing unrestricted access, by the external device, to the region of the non-volatile memory in response to verification of the forensic key received from the external device (340).

Figure 4A:
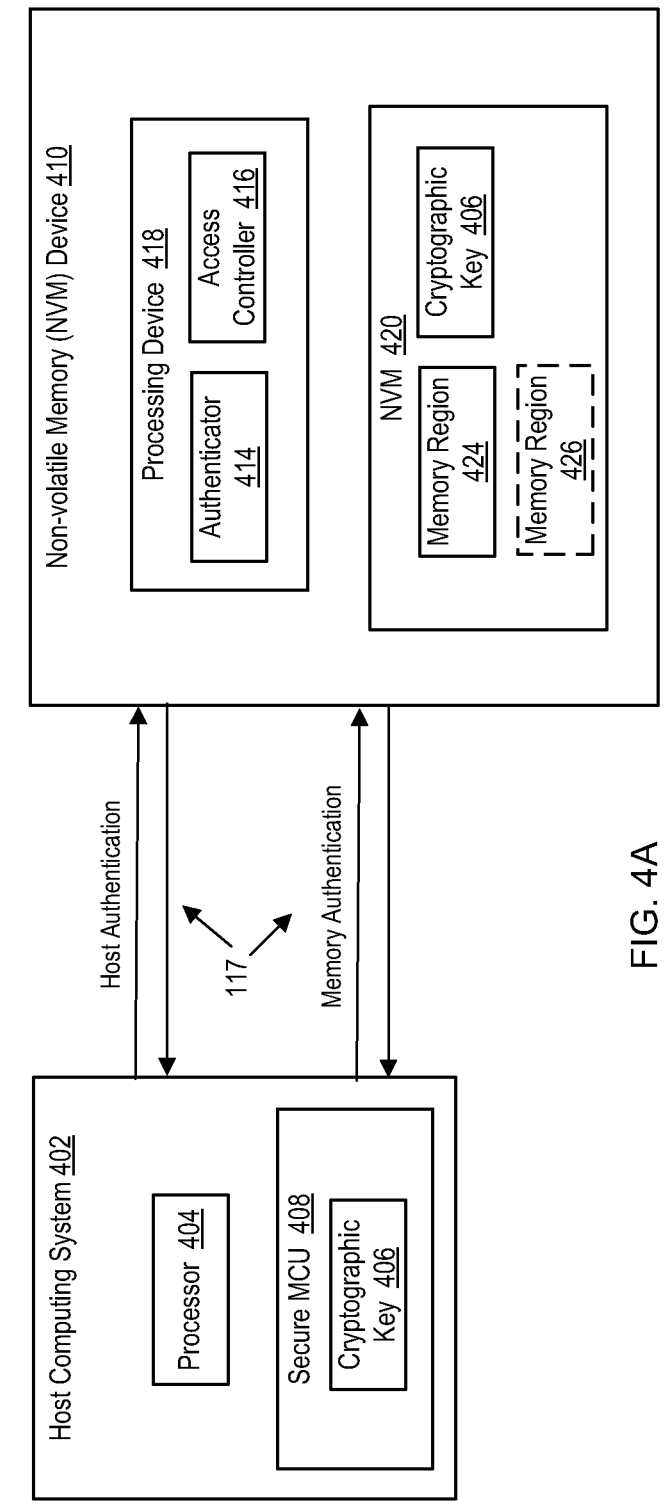
FIG. 4A is a block diagram of a system that employs a NVM device in which the host computing system has a secure MCU, according to an embodiment.

FIG. 4A is a block diagram of a system 400 that employs a NVM device 410 in which a host computing system 402 has a secure MCU 408, according to an embodiment. In embodiments, the host computing system 402 includes a processor 404 and the secure MCU 408. The secure MCU 408 may store or have access to a cryptographic key 406. Accordingly, the secure MCU 408 is capable of authenticated (or secure) access to the NVM 420 of the NVM device 410, as a part of normal operation.

In some embodiments, the NVM device 410 may further include a processing device 418 and a non-volatile memory (NVM) 420. In the embodiments, the processing device 418 includes an authenticator 414 and an access controller 416, and the NVM 420 includes a memory region 424 and the cryptographic key 406. The NVM 420 may further include at least a second memory region 426, which may be separately delineated and separately protected for reasons that will be explained later.

The authenticator 414 may authenticate access to the NVM 420, e.g., by the host computing system 402 and by the external device 140. The access controller 416 may determine what access rights are granted to the host computing system 402 or the external device 140, e.g., after authenication of such access by the authenticator 414. The access rights are as those discussed with reference to the authenticator 214 (FIG. 2). The cryptographic key 406 may be stored in the host computing system 402 and in the NVM 420 of the NVM device 410 at the time of manufacturing.

TABLE 2

| Step | Action | NVM State | Read/Write Access |
|---|---|---|---|
| 1 | Power Up | Locked | Restricted |
| 2 | Authenticate | Unlocked | Allowed |
| 3 | Logging | Unlocked | Allowed |
| 4 | Detect Power Loss Event | Unlocked | Allowed |
| 5 | Power Down/Loss | Locked | Restricted |

In various embodiments, with continued reference to FIG. 4A, Table 2 illustrates steps associated with authenticated communication between the host computing system 402 and the NVM device 410, and with detecting a crash or power loss event and locking the NVM 220 in response to the event. Upon powering up the system 400, the NVM device 410 may lock the NVM 420 and restrict access to at least the memory region 424 of the NVM 420. The different restrictions on access to the memory region 424 and the different ways of locking the memory region 424 were discussed with reference the system 200 of FIG. 2 and may be similarly applied to the system 400 of FIG. 4A.

Figure 4B:
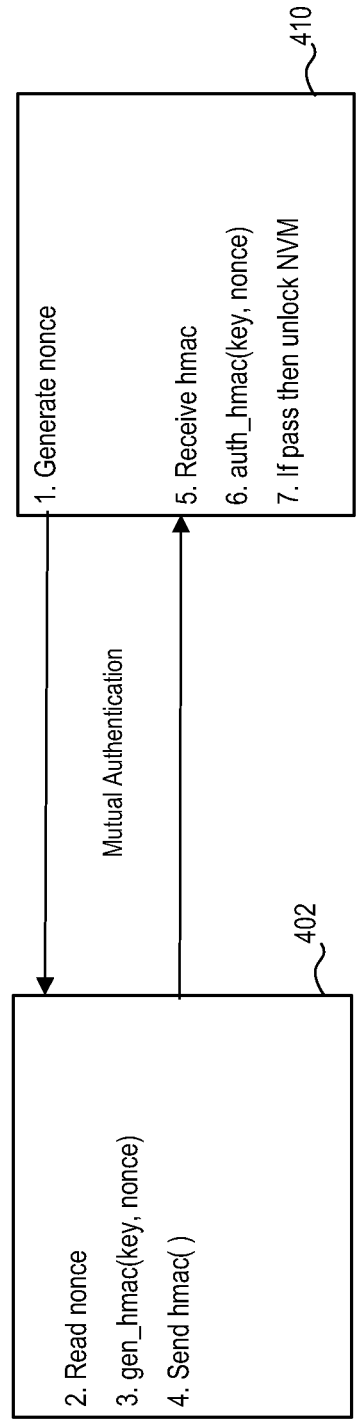
FIG. 4B is a flow diagram illustrating cryptographic authentication between the host computing system and the NVM device of the system of FIG. 4A, according to an embodiment.

In the various embodiments, as a part of or directly after the boot process, the authenticator 414 may authenticate access by the secure MCU 408 of the host computing system 402, therefore facilitating the mutual authentication for secure interactions between the host computing system 402 and the NVM device 410 (step 2). FIG. 4B is a flow diagram illustrating cryptographic authentication between the host computing system 402 and the NVM device 410 according an embodiment. In this embodiment, the authenticator 414 may generate a nonce value (such as a counter value that may be incremented each time a nonce value is generated) and send the nonce value to the host computing system 402. The secure MCU 408 of the host computing system 402 may read the nonce value and generate an HMAC over a combination of the cryptographic key 406 and the nonce value. The host computing system 402 may then send the HMAC to the NVM device 410. Upon receipt of the HMAC, the authenticator 414 may authenticate the HMAC as consistent with an HMAC generated by the authenticator 414 of the NVM device 410 using the same cryptographic key 406 and nonce value. In response to successful mutual authentication, the authenticator 414 may unlock the NVM 420 and permit unrestricted access to the memory region 424.

In the various embodiments, with reference to FIG. 4A and Table 2, in response to successful mutual authentication, the host computing system 402 may log data to the memory region 424 of the NVM 420 (step 3). The logging of the data may also be authenticated using the cryptographic key 406 because the secure MCU 408 is capable of encrypted data exchange with the NVM device 410. Accordingly, the data logs may be stored in encrypted form in the NVM 420.

The host computing system 402 may at some point detect a crash or power loss event (step 4) as was discussed with reference to system 200 of FIG. 2. Upon powering down or losing power, the NVM device 410 may apply the lock to the memory region 424 of the NVM 420 (step 5). The lock may cause the access controller 416 to apply restrictions on access to the memory region 424 by the external device 140 such as those discussed with reference to the system 200. Upon powering back up after such a crash or power loss event, the host computing system 402 and the NVM device 410 are to again mutually authenticate before logging of data to the memory region 424 is allowed (see FIG. 5).

In an alternative or additional embodiment, the processing device 418 partitions the logging regions of the NVM 420 to the memory region 424 (e.g., a first memory region) and at least a second memory region 426. The logging of data (e.g., operational data of the type stored in black box devices) may be performed by the host computing system 402 initially to only the first memory region, e.g., the memory region 424. A customer may purchase the system 400 with the NVM partitioned such that the first memory region and the second memory region 426 are evenly or unevenly partitioned.

In one embodiment, the lock applied at step 5 in response to a crash event, but which does not result in power loss, may be performed by the NVM device 410 invoking a wounding option. The wounding option may reduce the density of the NVM 420 in a way that removes the possibility of physical access to the memory region 424, or at least applies the restriction on access as previously discussed.

For example, in embodiments, the access controller 416 invokes a wounding option that applies the access restrictions on a portion of the NVM 420, effectively shrinking the writable portion of the NVM 420. In this embodiment, the access controller 416 may cause the first memory region to be restricted while the host computing system 402 may still write to the second memory region 426. In other words, the secure MCU 408 may log data to only the memory region 424 until a crash event is detected that is not accompanied by a loss in power to the NVM device 410. The subsequent lock on the NVM 420 may only put in place access restrictions on the memory region 424, while shifting the logging of data to the second memory region 426. If the NVM device 410 detects a subsequent power loss event, the lock may be extended to include applying the access restrictions to both the first and second memory regions 424 and 426. In further embodiments, as will be appreciated, the NVM 420 may be further partitioned into a third or subsequent memory region(s) for handling multiple sequential crash (or manufacturing flaw) events and still provide for continued logging of data up to and including a subsequent power loss event.

Figure 5:
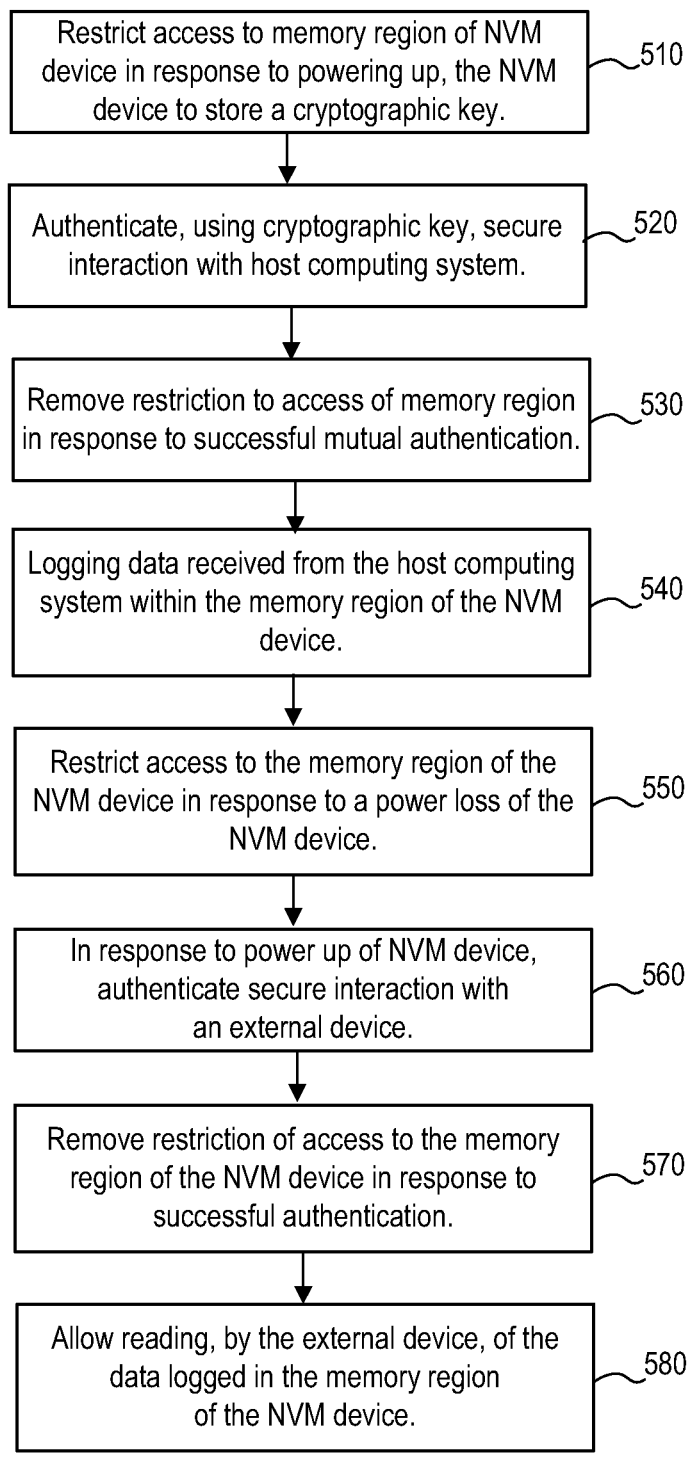
FIG. 5 is a flow chart of a method for securing data within the NVM device of FIG. 4A and FIG. 4B, according to an embodiment.

FIG. 5 is a flow chart of a method 500 for securing data within the NVM device 410 of FIG. 4A and FIG. 4B, according to an embodiment. The method 500 may be performed by processing logic that may comprise hardware (e.g., circuitry, dedicated logic, programmable logic, microcode, etc.), software (such as instructions run on a processing device), firmware, or a combination thereof. In one embodiment, the method 500 is performed by the NVM device 410, and more specifically by the processing device 418 of the NVM device 410.

With reference to FIG. 5, the method 500 may begin with the processing logic, in response to powering up the NVM device 410, restricting access to the memory region 424 of the non-volatile memory device, wherein the non-volatile memory device stores a cryptographic key (510). The method 500 may continue with the processing logic authenticating, using the cryptographic key, secure interaction with a host computing system 410, wherein the host computing system also stores the cryptographic key (520). The method 500 may continue with the processing logic unrestricting access to the memory region 424 of the NVM device 410 in response to successful mutual authentication (530). The method 500 may continue with the processing logic logging data received from the host computing system within the memory region 424 of the NVM device 410 (540). The method 500 may continue with the processing logic restricting access to the memory region 424 of the non-volatile memory device in response to a power loss of the NVM device 410 (550).

With additional reference to FIG. 5, the method 500 may continue with the processing logic, in response to powering up the NVM device 410 after the power loss, authenticating, using one of the cryptographic key or a forensic key, secure interaction with an external device such as the external device 140 (560). The method 500 may continue with the processing logic unrestricting access by the external device 140 to the memory region 424 of the NVM device 410 in response to successful authentication with the external device 140 (570). The method 500 may continue with the processing logic allowing reading, by the external device 140, of the data logged in the memory region 424 of the non-volatile memory device (580). The allowed access for reading may further be extended to allowing erasing data from or writing data to the memory region 424 of the NVM 420.

In an additional embodiment, a system includes a non-volatile memory device to store a cryptographic key and data, wherein the non-volatile memory device comprises one of ferroelectric random access memory (FRAM) or magnetoresistive random access memory (MRAM). The system may further include a processor coupled to the non-volatile memory device, the processor to write the data to the non-volatile memory device until a lock is detected on the non-volatile memory device. The system further include a processing device of the non-volatile memory device, the processing device to: assert the lock on the non-volatile memory in response to receipt of a lock signal; authenticate the cryptographic key within a message authentication code received from one of the processor or an external computing device coupled to the non-volatile memory device; and provide unrestricted access, by the one of the processor or the external computing device, to the non-volatile memory device in response to authentication of the cryptographic key. In one embodiment, the processor is to transmit the lock signal to the processing device in response to one of a power loss event or a crash event detected by the processor.

Figure 6:
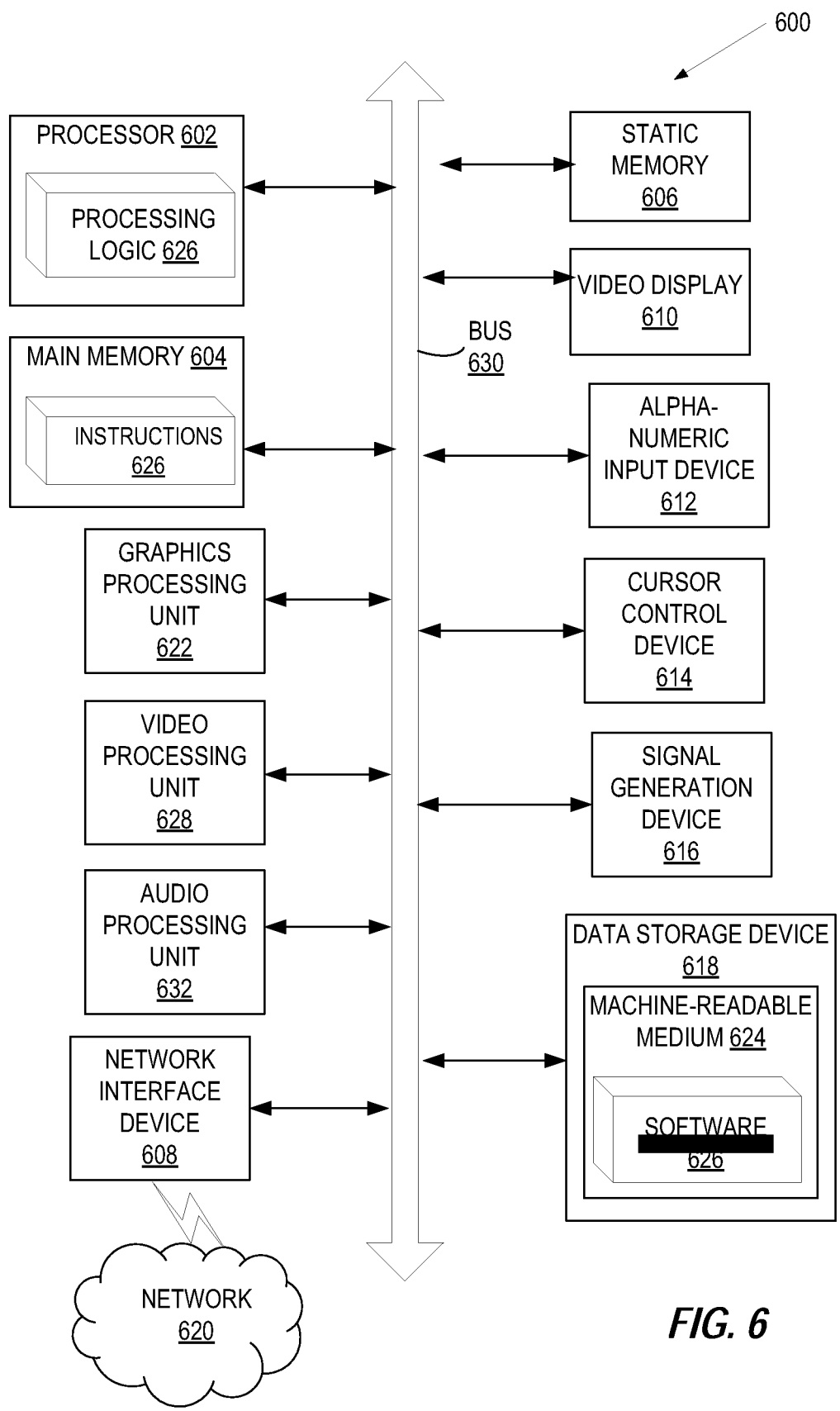
FIG. 6 illustrates a diagrammatic representation of a machine in the example form of a computing system within which a set of instructions, for causing the machine to perform any one or more of the methodologies discussed herein, may be executed.

FIG. 6 illustrates a diagrammatic representation of a machine in the example form of a computing system 600 within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a host computing system or computer, an automotive computing device, a server, a network device for an automobile network such as a controller area network (CAN) or local interconnected network (LIN), or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. The implementations of the converting pages and sections may be implemented in computing system 600.

The computing system 600 includes a processing device 602, main memory 604 (e.g., read-only memory (ROM), flash memory, dynamic random access memory (DRAM) (such as synchronous DRAM (SDRAM) or DRAM (RDRAM), etc.), a static memory 606 (e.g., flash memory, static random access memory (SRAM), etc.), and a data storage device 618, which communicate with each other via a bus 630.

Processing device 602 represents one or more general-purpose processing devices such as a microprocessor device, central processing unit, or the like. More particularly, the processing device may be complex instruction set computing (CISC) microprocessor device, reduced instruction set computer (RISC) microprocessor device, very long instruction word (VLIW) microprocessor device, or processing device implementing other instruction sets, or processing devices implementing a combination of instruction sets. Processing device 602 may also be one or more special-purpose processing devices such as an application specific integrated circuit (ASIC), a field programmable gate array (FPGA), a digital signal processing device (DSP), network processing device, or the like. In one implementation, processing device 602 may include one or more processing device cores. The processing device 602 is configured to execute instructions 626 for performing the operations discussed herein. In one implementation, processing device 602 may be part of the computing system 100, 200, or 400 of FIG. 1, FIG. 2, or FIG. 4A.

Alternatively, the computing system 600 may include other components as described herein. The computing system 600 may further include a network interface device 608 communicably coupled to a network 620. The computing system 600 also may include a video display unit 610 (e.g., a liquid crystal display (LCD)), an alphanumeric input device 612 (e.g., a keyboard), a cursor control device 614 (e.g., a mouse), a signal generation device 616 (e.g., a speaker), or other peripheral devices. Furthermore, computing system 600 may include a graphics processing unit 622, a video processing unit 628 and an audio processing unit 632. In another implementation, the computing system 600 may include a chipset (not illustrated), which refers to a group of integrated circuits, or chips, that are designed to work with the processing device 602 and controls communications between the processing device 602 and external devices. For example, the chipset may be a set of chips on a motherboard that links the processing device 602 to very high-speed devices, such as main memory 604 and graphic controllers, as well as linking the processing device 602 to lower-speed peripheral buses of peripherals, such as USB, PCI or ISA buses.

The data storage device 618 may include a computer-readable storage medium 624 on which is stored instructions 626 embodying any one or more of the methodologies of functions described herein. The instructions 626 may also reside, completely or at least partially, within the main memory 604 as instructions 626 and/or within the processing device 602 as processing logic during execution thereof by the computing system 600; the main memory 604 and the processing device 602 also constituting computer-readable storage media.

The computer-readable storage medium 624 may also be used to store instructions 626 utilizing the processing device 602, such as described with respect to FIG. 1, and/or a software library containing methods that call the above applications. While the computer-readable storage medium 624 is shown in an example implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instruction for execution by the machine and that cause the machine to perform any one or more of the methodologies of the implementations. The term "computer-readable storage medium" shall accordingly be taken to include, but not be limited to, solid-state memories, and optical and magnetic media.

In the above description, numerous details are set forth. It will be apparent, however, to one of ordinary skill in the art having the benefit of this disclosure, that embodiments of the present disclosure may be practiced without these specific details. In some instances, well-known structures and devices are shown in block diagram form, rather than in detail, in order to avoid obscuring the description.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one implementation, refers to the hardware, which is specifically configured to recognize and/or execute the code to be held on a non-transitory medium. Furthermore, in another implementation, use of a module refers to the non-transitory medium including the code, which is specifically adapted to be executed by the microcontroller to perform predetermined operations. And as may be inferred, in yet another implementation, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one implementation, use of the term logic includes hardware, such as transistors, registers, or other hardware, such as programmable logic devices.

Use of the phrase 'configured to,' in one implementation, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one implementation, refers to some apparatus, logic, hardware, and/or element designed in such a way to enable use of the apparatus, logic, hardware, and/or element in a specified manner. Note as above that use of to, capable to, or operable to, in one implementation, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one implementation, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "adjusting," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an embodiment" or "one embodiment" throughout is not intended to mean the same embodiment or embodiment unless described as such.

Embodiments described herein may also relate to an apparatus for performing the operations herein. This apparatus may be specially constructed for the required purposes, or it may comprise a general-purpose hardware selectively activated or reconfigured by a firmware stored therein. Such firmware may be stored in a non-transitory computer-readable storage medium, such as, but not limited to, NVMs, read-only memories (ROMs), random access memories (RAMs), EPROMs, EEPROMs, flash memory, or any type of media suitable for storing electronic instructions. The term "computer-readable storage medium" should be taken to include a single medium or multiple media that store one or more sets of instructions. The term "computer-readable medium" shall also be taken to include any medium that is capable of storing, encoding or carrying a set of instructions for execution by the hardware and that causes the hardware to perform any one or more of the methodologies of the present embodiments. The term "computer-readable storage medium" shall accordingly be taken to include, but not be limited to, solid-state memories, optical media, electro-magnetic media, any medium that is capable of storing a set of instructions for execution by hardware and that causes the hardware to perform any one or more of the methodologies of the present embodiments.

The above description sets forth numerous specific details such as examples of specific systems, components, methods and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth above are merely exemplary. Particular embodiments may vary from these exemplary details and still be contemplated to be within the scope of the present disclosure.

It is to be understood that the above description is intended to be illustrative and not restrictive. Many other embodiments will be apparent to those of skill in the art upon reading and understanding the above description. The scope of the disclosure should, therefore, be determined with reference to the appended claims, along with the full scope of equivalents to which such claims are entitled.

In the above description, for purposes of explanation, numerous specific details are set forth in order to provide a thorough understanding of the present disclosure. It will be evident, however, to one skilled in the art that the present disclosure may be practiced without these specific details. In other instances, well-known circuits, structures, and techniques are not shown in detail, but rather in a block diagram in order to avoid unnecessarily obscuring an understanding of this description.

Reference in the description to "one embodiment" or "an embodiment" means that a particular feature, structure, or characteristic described in connection with the embodiment is included in at least one embodiment of the disclosure. The phrase "in one embodiment" located in various places in this description does not necessarily refer to the same embodiment.

What is claimed is:

1. An apparatus comprising:
    non-volatile memory to store a forensic key and data, the data received from a host computing system; and
    a processing device coupled to the non-volatile memory, wherein the processing device is to:
        allow writing the data, by the host computing system, to a region of the non-volatile memory;
        detect a power loss of the non-volatile memory;
        in response to the power loss:
            detect a lock signal comprising information embedded within an opcode of a serial peripheral interface (SPI) command received from the host computing system, the information specifying a restriction on access to the region of the non-volatile memory;
            retrieve the information from the opcode of the SPI command; and
            assert, responsive to the information, a lock on the region of the non-volatile memory, the lock to cause the restriction on access to the region of the non-volatile memory by an external device; and
        provide unrestricted access, by the external device, to the region of the non-volatile memory in response to verification of the forensic key received from the external device.

2. The apparatus of claim 1, wherein the restriction on access comprises read-only access to the region of the non-volatile memory.

3. The apparatus of claim 1, wherein the restriction on access comprises writing to only erased sectors of the region of the non-volatile memory.

4. The apparatus of claim 1, wherein the restriction on access comprises disallowance of erasure of one or more sectors of the region of the non-volatile memory.

5. The apparatus of claim 1, wherein the restriction on access comprises full access to some sectors and no access to other sectors of the region of the non-volatile memory.

6. The apparatus of claim 1, wherein the restriction on access comprises limited access to some sectors and no access to other sectors of the region of the non-volatile memory.

7. The apparatus of claim 1, wherein the non-volatile memory comprises one of ferroelectric random access memory (FRAM) or magnetoresistive random access memory (MRAM).

8. The apparatus of claim 1, further comprising a lock pin coupled to the processing device, wherein the lock pin is asserted by the lock signal to assert the lock.

9. The apparatus of claim 1, wherein the lock comprises a memory location in the region of the non-volatile memory to which a lock command, within the lock signal, is written.

10. A method comprising:
    in response to powering up a non-volatile memory device, restricting, by a processing device of the non-volatile memory device, access to a memory region of the non-volatile memory device, wherein the non-volatile memory device stores a cryptographic key;
    authenticating, by the processing device using the cryptographic key, secure interaction with a host computing system, wherein the host computing system also stores the cryptographic key;
    unrestricting, by the processing device, access to the memory region of the non-volatile memory device in response to successful authentication;
    logging, by the processing device, data received from the host computing system within the memory region of the non-volatile memory device;
    detecting, by the processing device, a power loss of the non-volatile memory device;
    receiving, from the host computing system responsive to the power loss, a lock signal comprising information embedded within an opcode of a serial peripheral interface (SPI) command, the information specifying a restriction on access to the memory region of the non-volatile memory; and
    restricting, by the processing device, access to the memory region of the non-volatile memory device with restrictions corresponding to the information.

11. The method of claim 10, further comprising:
    in response to powering up the non-volatile memory device after the power loss, authenticating, by the processing device using one of the cryptographic key or a forensic key, secure interaction with an external device;
    unrestricting, by the processing device, access by the external device to the memory region of the non-volatile memory device in response to successful authentication with the external device; and
    allowing reading, by the external device, of the data logged in the memory region of the non-volatile memory device.

12. The method of claim 10, wherein restricting access to the memory region of the non-volatile memory device comprises allowing read-only access.

13. The method of claim 10, wherein restricting access to the memory region of the non-volatile memory device comprises allowing writing to only erased sectors of the memory region.

14. The method of claim 10, wherein restricting access to the memory region of the non-volatile memory device comprises disallowance of erasure of one or more sectors of the memory region.

15. The method of claim 10, wherein restricting access to the memory region of the non-volatile memory device comprises allowing full access to some sectors and no access to other sectors of the memory region.

16. The method of claim 10, wherein restricting access to the memory region of the non-volatile memory device comprises allowing limited access to some sectors and no access to other sectors of the memory region.

17. A system comprising:
a non-volatile memory (NVM) device, wherein the NVM device comprises a processing device and NVM, wherein the NVM is to store a forensic key and data;
a host computing system coupled to the NVM device, the host computing system comprising a processor to write the data to the NVM until a lock is detected on the NVM device; and
wherein the processing device is to:
  detect a power loss of the non-volatile memory;
  detect, responsive to the power loss, a lock signal received from the host computing system, the lock signal comprising information embedded within an opcode of a serial peripheral interface (SPI) command, the information specifying a restriction on access to a region of the non-volatile memory;
  assert, responsive to the information retrieved from the opcode of the SPI command, the lock on the non-volatile memory, wherein the lock includes the restriction on access;
  verify the forensic key received from one of the host computing system or an external computing device coupled to the NVM device; and
  provide unrestricted access, by the one of the host computing system or the external computing device, to the NVM of the non-volatile memory device in response to verification of the forensic key.

18. The system of claim 17, wherein the processor is to transmit the lock signal to the NVM device in response to one of a power loss event or a crash event detected by the processor.

19. The system of claim 17, wherein the processing device is further to, before receipt of the lock signal:
  authenticate secure interaction with the host computing system using a cryptographic key; and
  allow logging of the data in the NVM in response to successful authentication.

20. The system of claim 17, wherein the non-volatile memory device comprises one of ferroelectric random access memory (FRAM) or magnetoresistive random access memory (MRAM).

* * * * *